US011107472B2

(12) United States Patent
Amores et al.

(10) Patent No.: US 11,107,472 B2
(45) Date of Patent: Aug. 31, 2021

(54) MANAGEMENT OF HUMAN-MACHINE DIALOGUE INVOLVING MULTIPLE PARTIES

(71) Applicant: Intel Corporation, Santa Clara, CA (US)

(72) Inventors: Gabriel Amores, Seville (ES); Guillermo Perez, Seville (ES)

(73) Assignee: Intel Corporation, Santa Clara, CA (US)

(*) Notice: Subject to any disclaimer, the term of this patent is extended or adjusted under 35 U.S.C. 154(b) by 79 days.

(21) Appl. No.: 16/489,605

(22) PCT Filed: Mar. 31, 2017

(86) PCT No.: PCT/EP2017/057790
§ 371 (c)(1),
(2) Date: Aug. 28, 2019

(87) PCT Pub. No.: WO2018/177561
PCT Pub. Date: Oct. 4, 2018

(65) Prior Publication Data
US 2020/0020333 A1 Jan. 16, 2020

(51) Int. Cl.
*G10L 15/22* (2006.01)
*B25J 11/00* (2006.01)
(Continued)

(52) U.S. Cl.
CPC ........... *G10L 15/22* (2013.01); *B25J 11/0005* (2013.01); *G10L 15/26* (2013.01); *G10L 15/32* (2013.01); *G10L 2015/228* (2013.01)

(58) Field of Classification Search
CPC .................... G10L 15/22; G10L 2015/223
See application file for complete search history.

(56) References Cited

U.S. PATENT DOCUMENTS

| 2009/0210227 | A1 | 8/2009 | Sugiyama et al. |
| 2010/0130128 | A1 | 5/2010 | Liao |
| 2017/0125008 | A1* | 5/2017 | Maisonnier ............ G06N 3/008 |

OTHER PUBLICATIONS

Sugiyama, Takaaki, et al. "Estimating response obligation in multi-party human-robot dialogues." 2015 IEEE-RAS 15th International Conference on Humanoid Robots (Humanoids). IEEE, 2015. (Year: 2015).*

(Continued)

*Primary Examiner* — Jialong He
(74) *Attorney, Agent, or Firm* — Hanley, Flight & Zimmerman, LLC

(57) ABSTRACT

Methods, systems and articles of manufacture for a communication system that allows a robot to interact with users via a single party dialogue strategy or a multi-party dialogue strategy are disclosed. An example communication system includes a distance tracker to determine whether any of a plurality of parties has come within a conversation distance of the communication system. The example communication system can also include a first dialogue handler in communication with a first memory storing a single party dialogue processing algorithm and a second dialogue handler in communication with a second memory storing a multi-party dialogue processing algorithm. Based on information supplied by the distance tracker, a dialogue mode selector selects between the first dialogue handler and the second dialogue handler to process conversations between the robot and a first party and the robot and a second party.

22 Claims, 8 Drawing Sheets

(51) Int. Cl.
   *G10L 15/32*   (2013.01)
   *G10L 15/26*   (2006.01)

(56) References Cited

OTHER PUBLICATIONS

Salam, Hanan, and Mohamed Chetouani. "Engagement detection based on mutli-party cues for human robot interaction." 2015 International Conference on Affective Computing and Intelligent Interaction (ACII). IEEE, 2015. (Year: 2015).*

Skantze, Gabriel, Martin Johansson, and Jonas Beskow. "Exploring turn-taking cues in multi-party human-robot discussions about objects." Proceedings of the 2015 ACM on international conference on multimodal interaction. 2015. (Year: 2015).*

Yumak, Zerrin, and Nadia Magnenat-Thalmann. "Multimodal and multi-party social interactions." Context aware human-robot and human-agent interaction. Springer, Cham, 2016. 275-298. (Year: 2016).*

International Bureau, "International Preliminary Report on Patentability," mailed in connection with International Patent Application No. PCT/EP2017/057790, dated Oct. 1, 2019, 8 pages.

International Searching Authority, "International Search Report," mailed in connection with International Patent Application No. PCT/EP2017/057790, dated Mar. 31, 2017, 5 pages.

International Searching Authority, "Written Opinion," mailed in connection with International Patent Application No. PCT/EP2017/057790, dated Mar. 31, 2017, 7 pages.

Bouhus et al., "Models for Multiparty Engagement in Open-World Dialog," Proceedings of the 10th Annual Meeting of the Special Interest Group in Discourse and Dialogue, Sep. 11, 2009, pp. 225-234.

Michalowski et al., "A Spatial Model of Engagement for a Social Robot," 9th IEEE International Workshop on Advanced Motion Control, Mar. 2006, pp. 762-767.

"Occupancy Sensor," Wikipedia, Mar. 20, 2017, 3 pages. Retrieved from: https://en.wikipedia.org/w/index/php?title=Occupancy_sensor&oldid=771293338.

Pettijohn, "Interpersonal Distance," Psychology: A ConnecText, Dec. 31, 2003, 2 pages. Retrieved from http://www.mhhe.com/cls/psy/ch15/intdis.mhtml.

Traum et al., "Embodied Agents for Multi-party Dialogue in Immersive Virtual Worlds," Proceedings of the International Joint Conference on Autonomous Agents and Multiagent Systems, Jul. 15, 2002, 8 pages.

Traum, "Issues in Multiparty Dialogues," Advances in Agent Communication, Jan. 31, 2004, 11 pages.

* cited by examiner

MANAGEMENT OF HUMAN-MACHINE DIALOGUE INVOLVING MULTIPLE PARTIES

FIELD OF THE DISCLOSURE

This disclosure relates generally to human-machine dialogue, and, more particularly, to managing human-machine dialogue involving multiple parties.

BACKGROUND

In the early days of computing, humans communicated with machines by entering information via punch cards and, later, via keyboard-entered commands that followed a specific command protocol. As such, only very specifically trained individuals could communicate with these early computers. Those days, however, are long gone as human-machine communications are becoming increasingly more robust. For example, the average person can now communicate with a smart phone simply via spoken language and the smart phone can, in most instances, appropriately respond to such spoken language by executing a computer search, asking a follow-up question, etc. As a result of the increased abilities of machines to communicate with humans, machines, such as robots, are increasingly being deployed in public places to assist humans.

BRIEF DESCRIPTION OF THE DRAWINGS

The figures are not to scale. Wherever possible, the same reference numbers will be used throughout the drawing(s) and accompanying written description to refer to the same or like parts.

DETAILED DESCRIPTION

Figure 1:
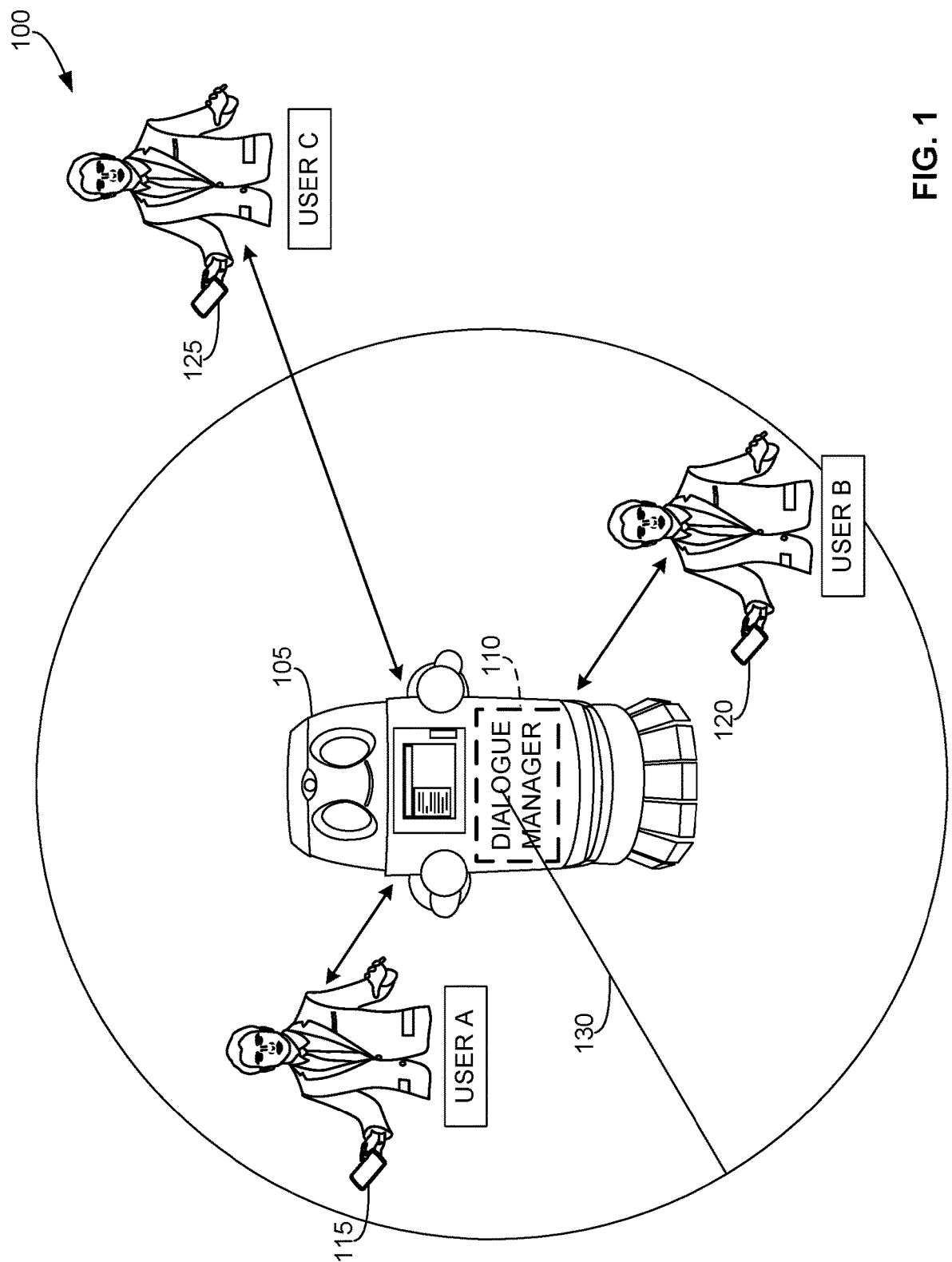
FIG. 1 is a diagram of multiple communicative entities/parties including several humans and an example robot having an example dialogue manager for managing human-machine dialogue involving multiple parties.

Human-machine communications are becoming increasingly more robust. As a result of the increased abilities of machines to communicate with humans, machines, such as robots, are increasingly being deployed in public places to assist humans. For example, public places frequented by travelers, tourists, and/or other information seekers that are often staffed by humans operating a help desk can also or instead be equipped with one more robots capable of answering questions and/or providing information to passers-by. However, existing robot communication technologies are typically designed to support one-on-one dialogue strategies (i.e., one party engaging in dialogue with one party), whereas real life often involves multi-party dialogues (e.g., one party engaging in one dialogue with more than one party, one party engaging in multiple dialogues with multiple parties at a same or nearly same time, multiple parties engaging in a same dialogue at a same time, etc.). Further, existing robot communication technologies are not equipped to detect when to switch from using a one-to-one dialogue strategy (also referred to as a single party dialogue strategy) to using a multi-party strategy.

As a result, of these deficiencies, deploying robots as informational stand-ins for humans is problematic. Consider a situation in which a museum deploys a robot to offer exhibit information, direct museum goers, answer general questions, etc. The museum goers are supplied with portable electronic devices with which to communicate with the robot using text, voice, etc., and/or an app to access software that allows communication with the museum robot via user smart phones. The museum goers are able to communicate with the robot using the handheld devices and/or smart phones while located on grounds of the museum.

In a first scenario, museum goers engaging the robot in a conversation (e.g., sending a request for information) are relatively distant from the robot (e.g., neither in sight nor within hearing distance of the robot). A museum goer positioned at such a distance transmits the request for information wirelessly using the portable electronic device and the robot responds by wirelessly transmitting information back to the electronic device for output to the museum goer. In this first scenario, a one-on-one dialogue strategy works well. Further, the robot can respond to all such museum goers in the same scenario in parallel. In fact, the museum goers in this first scenario are likely unaware and/or do not care that other museum goers are also conversing with the robot about other issues/concerns at the same time.

In a second scenario, museum goers engaging the robot in a conversation (e.g., sending a request for information) are within sight or sound of the robot but not necessarily within close enough proximity to hear audio output of the robot issued at a conversation level and vice versa. Some of these museum goers may seek the novelty of speaking directly to the robot and/or at least hearing the robot speak directly to them while others may wish to continue to converse with the robot using the electronic device exclusively. When a person approaches a help desk staffed by a human, there may be a queue, a mechanism by which a queue number is assigned, or people may simply mill about waiting to catch the attention of the human manning the information desk. When a person operating the information desk is interacting with a first person and notices a second person also in need of attention, the person operating the information desk may politely interrupt a current conversation with the first person and turn to the second person to say that service will be rendered shortly before again returning to the first person. A robot using a single party dialogue strategy cannot perform this simple task of interrupting a first conversation to enter a second conversation to notify a second person in need of service that such service will be rendered shortly. The inability to perform such a simple task would leave the second, and possibly a third person, a fourth person, etc. concerned that they have not been noticed and will not get service which typically leads to severe disruption of the service model. Further, even a robot equipped to engage in both single party and multi-party dialogue strategies would require mechanisms to know when to convert from a single party to a multi-party strategy. Currently, such mechanisms do not exist.

Methods, apparatus, and articles of manufacture disclosed herein determine whether any of a plurality of parties has come within a conversation distance of a dialogue manager installed in, for example, a robot. Based on whether a first party comes within the conversation distance, a dialogue mode selector causes a single party dialogue handler to use a first dialogue processing algorithm to process a first conversation with the first party. Based on whether a second party comes within the conversation distance, the dialogue mode selector causes the single party dialogue handler to stop the first dialogue processing algorithm (but save the conversation history of the first conversation) and causes a multi-party dialogue handler to execute a second dialogue processing algorithm to pick up the processing of the first conversation/dialogue with the first party and to begin processing the second conversation/dialogue with the second party. The first dialogue processing algorithm (also referred to as a "single party dialogue processing algorithm") is designed to support one-on-one dialogue processing and the second dialogue processing algorithm (also referred to as a "multi-party dialogue processing algorithm") is designed to support multi-party dialogue processing. Thus, the dialogue manager disclosed herein uses both a conversation distance and a number of people within the conversation distance of the robot implementing the dialogue manager as a basis for switching between a one-on-one dialogue strategy and a multi-party dialogue strategy when engaging in conversation with humans. As used herein the term "conversation distance" is defined to include either or both of a conversation hearing distance (also referred to herein as a "hearing-based distance") and a conversation visual distance (also referred to herein as a "visual-based distance"). The conversation hearing distance is defined as a physical distance between two people that has a magnitude such that each person expects to be heard by the other person when speaking in a conversation tone/manner (e.g., not shouting, not whispering, etc.). The conversation hearing distance can be determined empirically. Methods to empirically determine a threshold hearing distance include, but are not limited to: conducting wizard of Oz experiments between humans and an (emulated) system, and directly observing similar human-to-human scenarios. The observed distances are measured and an average distance is calculated. The conversation visual distance is defined as a distance between two people having a magnitude such that, each person people can easily perceive the lip movements and gestures of the other person when speaking/gesturing (assuming no visual obstructions stand between the people). The conversation visual distance can be determined empirically. Methods to empirically determine a threshold visual distance include, but are not limited to: conducting wizard of Oz experiments between humans and an (emulated) system, and directly observing similar human-to-human scenarios. The observed distances are measured and an average distance is calculated. The conversation distance can take into account the shorter of the conversation hearing distance and/or the conversation visual distance. As described above and hereinafter, people coming within the conversation distance of the robot affect the dialogue strategy used by the robot when engaging in conversation with the robot.

The dialogue manager disclosed herein can include ambient visual sensors to sense environmental factors affecting visibility (e.g., lighting, visibility, etc.) in an area surrounding the robot and can also include ambient audio sensors to sense environmental factors affecting audio in the area surrounding the robot (e.g., background noise levels). The data supplied by such sensors can be used to adjust empirically-determined hearing-based distance values and empirically-determined visual-based distance values. Thus, the dialogue manager can store an empirically pre-determined set of values for the hearing-based distance and the visual-based distance and can use the ambient visual and audio data to adjust those values to account for environmental conditions at the site/time of module/robot deployment.

In some examples, at least some of the people communicating with the robot are communicating via portable electronic devices (e.g., tablets, smart phones, personal digital assistants, laptop computers, etc.). In some examples, people within the conversation distance and people outside the conversation distance of the robot communicate with the robot using such electronic devices. The robot may communicate with electronic devices (located inside and/or outside of the conversation distance) in parallel and simultaneously. Each such robot-to-electronic device dialogue/conversation can occur using a single party dialogue strategy. In contrast, in examples where multiple people are communicating with the robot and are located within the conversation distance of the robot, the multiple people have, by virtue of close proximity to the robot, different social expectations. Thus, in these circumstances, multi-party dialogue strategies are employed by the robot when processing such dialogues/conversations.

In some examples disclosed herein, the dialogue manager includes a distance tracker that can determine the distances between the parties and the robot. In some examples, the distance tracker uses information supplied by the portable handheld devices to determine the distances of the parties from the robot. The distance of each of the parties from the robot is then compared to the conversation distance. When the distance between a party and the robot is less than or equal to the conversation distance, the party is determined to have come within the conversation distance and triggers one or more actions on the part of the dialogue manager.

In some examples, when the dialogue manager detects a party has come within the conversation distance, the dialogue manager causes either of a single party dialogue processing algorithm or a multi-party dialogue processing algorithm to process a conversation between the party and the robot. The dialogue processing algorithm used depends on how many other parties are presently within the conversation distance and/or how many of the other parties within the conversation distance are currently engaged in a conversation with the robot. The conversation between the robot and the party that has entered within the conversation distance of the robot may have been on-going prior to the person entering within the conversation distance (e.g., conducted via the portable electronic device).

Thus, dialogue managers disclosed herein provide the ability to process conversations using either a single party dialogue processing algorithm or a multi-party dialogue processing algorithm and deploy a conversation distance metric as a tool in determining which of the dialogue processing algorithms are to be used. A robot having such a dialogue manager is able to engage in many one-on-one conversations with parties that are located outside of the conversation distance yet can also deploy a multi-party dialogue technique for conversations with parties located within the conversation distance. In addition, the robot having the dialogue manager can convert an on-going conversation conducted via an electronic device and being processed using a single party dialogue processing algorithm to a conversation being processed using a multi-party dialogue progressing algorithm and humanly audible.

FIG. 1 is a diagram of an example conversation scenario 100 in which an example robot 105 having an example dialogue manager 110 can communicate with example users (user A, user B, user C) using respective electronic handheld devices (user A device 115, user B device 120, user C device 125). The robot 105 is at the center of a circle having a radius equal to a conversation distance 130 such that the objects located within the circle are described as being within the conversation distance 130 of the robot 105. As described earlier, the term "conversation distance" is defined to include either or both of a conversation hearing distance and a conversation visual distance. The conversation hearing distance is defined as a distance between two people that has a magnitude such that each person expects to be heard by the other person when speaking in a conversation tone/manner (e.g., not shouting, not whispering, etc.). The conversation hearing distance can be determined empirically. The conversation visual distance is defined as a distance between two people having a magnitude such that, each person people can easily perceive the lip movements and gestures of the other person when speaking/gesturing (assuming no visual obstructions stand between the people). The conversation hearing distance can be determined empirically. The dimensions of the conversation distance 30 can take into account the shorter of the conversation hearing distance and/or the conversation visual distance and/or any combination of the two. As shown, in the conversation scenario 100 of FIG. 1, the user A and the user B are located within the conversation distance 130 of the robot 105 and the user C is not located within the conversation distance 130 of the robot 105.

Figure 2:
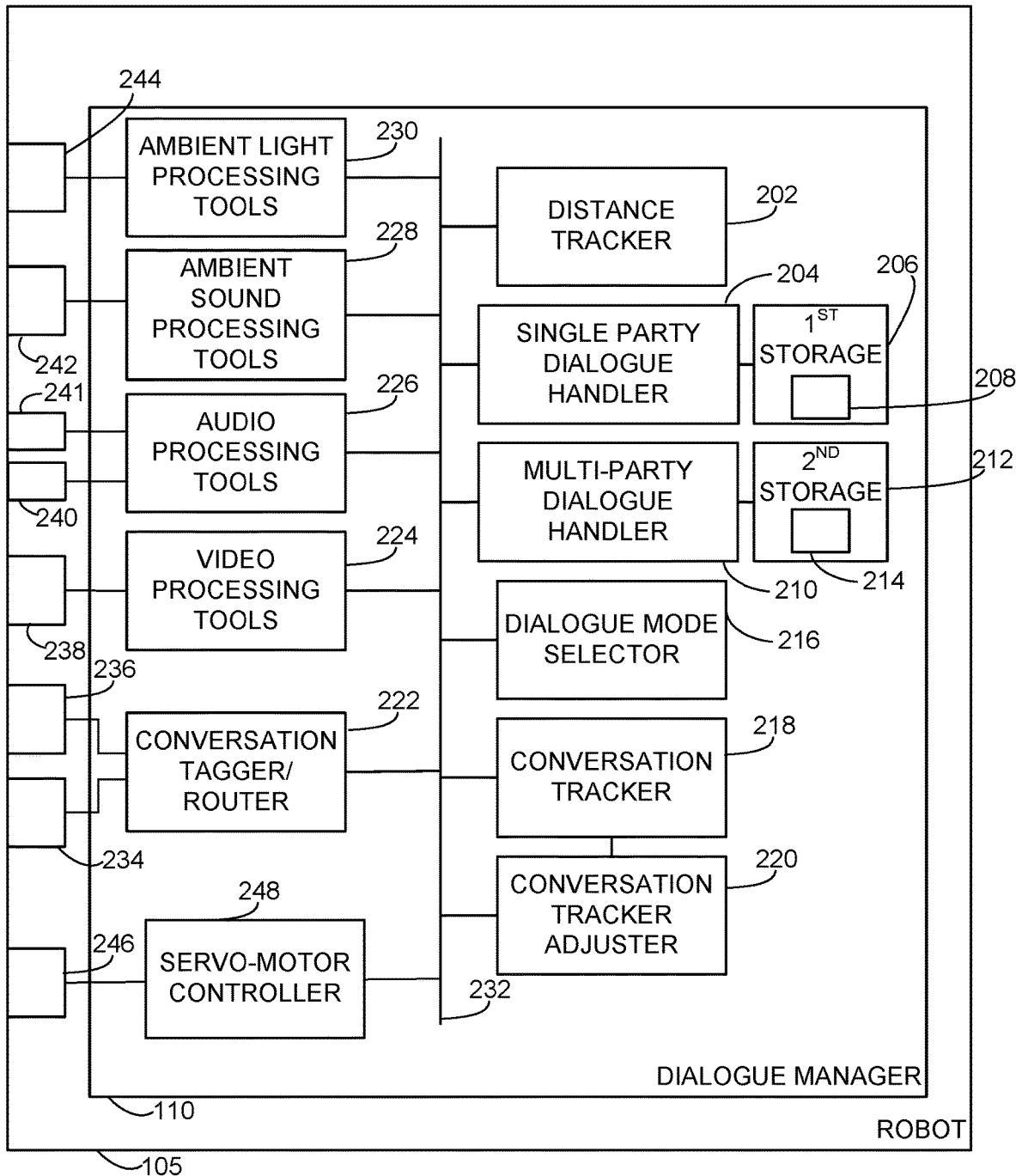
FIG. 2 is a block diagram of an example implementation of the dialogue manager for managing human-machine dialogue involving multiple parties installed in the robot of FIG. 1.

FIG. 2 is a block diagram of an example implementation of the example dialogue manager 110 of FIG. 1. In the illustrated example of FIG. 2, the dialogue manager 110 includes an example distance tracker 202, and an example single party dialogue handler 204. The single party dialogue handler is in communication with an example first storage 206 storing an example first dialogue/conversation processing algorithm 208. The dialogue manager 110 of this example also includes an example multi-party dialogue handler 210. The multi-party dialogue handler 210 is in communication with an example second storage 212 storing an example second dialogue/conversation processing algorithm 214. In some examples, the first dialogue/conversation processing algorithm 208 supports single party dialogue processing thereby allowing the robot 105 to engage in a one-on-one conversation with a user (e.g., the user A, the user B, the user C, etc.). Further, using single party dialogue processing multiple one-on-one conversations (each with a different party (user device)) may be handled in parallel without the knowledge of non-participating parties. The single party processing algorithm and/or the single party dialogue handler can be implemented using any of a finite-state machine, a rule-based approach to dialogue management (e.g., Information State Update Approach), a blackboard architecture, a statistical approach that employs supervised and unsupervised machine learning, etc.

The multi-party dialogue processing algorithm 214 supports multi-party dialogue processing thereby allowing the robot 105 to engage in multi-party conversations with two or more users located within the conversation distance 130 (e.g., the user A, and the user B). The multi-party dialogue processing algorithm 214 can be implemented using any multi-party dialogue algorithm (e.g., the multi-party algorithm described in "Integration of Visual Perception in Dialogue Understanding for Virtual Humans in Multi-Party Interaction," by Traum and Morency, AAMAS International Workshop on Interacting with ECAs as Virtual Characters, 2010).

The example single dialogue processing algorithm 208 handles conversations simultaneously (or not) independent of other conversations. In contrast, the example multi-party dialogue processing algorithm 214 handles conversations with multiple parties at a same time but not in an independent manner. For example, a first conversation is paused before a second conversation is continued and the second conversation would be paused before the first conversation is continued. Thus, the individual multi-party conversations are advanced in an interleaved manner, as needed, and paused relative to other conversations, when needed.

The example dialogue manager 110 also includes an example dialogue mode selector 216, an example conversation tracker 218, an example conversation tracker adjuster 220, an example conversation tagger/router 222, example video processing tools 224, example audio processing tools 226, example ambient sound processing tools 228, example ambient light processing tools 230, and example servomotor controller(s) 248. In some such examples, the above-described components of the dialogue manager 110 are coupled via a common data bus 232.

In some examples, the example distance tracker 202 determines whether any user comes within the conversation distance 130 of the robot 105. If, for example, a first user (e.g., the user A) comes within the conversation distance 130 of the robot 105, the distance tracker 202 notifies the example dialogue mode selector 216. The dialogue mode selector 216, (assuming that no other users are currently within the conversation distance 130 of the robot 105) causes the single party dialogue handler 204 to execute the single party dialogue processing algorithm 208 to continue to process any conversation occurring between the user A and the robot 105. Thus, the conversation between the user A and the robot 105 is processed using a single party dialogue/conversation processing algorithm/strategy due to the fact that no other parties (user devices) are close enough (e.g., within the conversation distance 130) to engage in a humanly audible conversation with the robot. In some such examples, the conversation may have begun before the user device came within the conversation distance in which case the conversation was already being processed by the single party dialogue processing algorithm and continues to be processed by the single party dialogue processing algorithm after entering the conversation distance. In some examples, the dialogue mode selector 216 causes the single party dialogue handler 204 and the multi-party dialogue handler 210 to perform a handoff procedure wherein the conversation is handed off from the single party dialogue handler 204 to the multi-party dialogue handler 210.

If, while the user A holding the user A device 115 is within the conversation distance 130 of the robot 105 and still conversing (presumably) with the robot 105, the example distance tracker 202 determines that the user B holding the user B device 120 has come within the conversation distance 130, the distance tracker 202 notifies the example dialogue mode selector 216 of the entry of the user B device 120. The dialogue mode selector 216, responds to the notification by causing the example single party dialogue handler 204 to stop processing the first conversation with the user A (but to retain the conversation history of the conversation) and causing the example multi-party dialogue handler 210 to begin executing the multi-party dialogue processing algorithm 214 to process the first conversation (based on the conversation history) between the user A and the robot 105 and the second conversation between the user B and the robot 105 in a multi-party manner.

In some examples, the example dialogue mode selector 216, prior to switching the processing of a conversation from the example single party dialogue handler 204 to the example multi-party dialogue handler 210, determines the number of users currently within the conversation distance 130 of the example robot 105 and/or the number of the users within the conversation distance 130 engaged in a conversation with the example robot 105 by consulting the example conversation tracker 218. The conversation tracker 218 tracks the number of current conversations being conducted in a multi-party manner by the multi-party dialogue handler 210. In some examples, the conversation tracker adjuster 220 adjusts (increments/decrements) the number of conversations being conducted with the robot in a multi-party manner based on information received from the example distance tracker 202, or the example multi-party dialogue handler 210. In some examples, the distance tracker 202 notifies the conversation tracker adjuster 220 when a user has entered or left the area defined by the conversation distance 130 surrounding the robot 105, thereby causing the conversation tracker adjuster 220 to correspondingly increment or decrement the conversation tracker 218 based on whether a user device has entered or left the conversation distance 130. In some examples, the multi-party dialogue handler 210 notifies the conversation tracker adjuster 220 when a conversation with any of the users (the user A, the user B, the user C) via the user devices (the user A device 115, the user B device 120, the user C device 125) has terminated.

In some examples, the example portable electronic devices (e.g., the user A device 115, the user B device 120, the user C device 125, etc.) are configured to communicate with the robot using one or more wireless technologies (e.g., WiFi, Bluetooth, Cellular Telephony, etc.). As such the example robot 105 includes one or more wireless transceivers 234, 236 adapted to receive the wireless communications transmitted by the user A device 115, the user B device 120, and the user C device 125. In some examples, the wireless transceivers 234, 236 provide the communications with information (e.g., data or metadata) identifying the source of each of the communications to the example conversation tagger/router 222. The conversation tagger/router 222 uses the source (e.g. user device) identifying information provided with each communication to determine whether the communication is associated with a conversation to be transmitted to the example single party dialogue handler 204 for single party processing or is associated with a conversation to be transmitted to the example multi-party dialogue handler 210 for multi-party conversation processing. In some examples, the conversation tagger/router 222 maintains information that associates each user device identifier (involved in a conversation with the robot 105) with either the single party dialogue handler 204 or the multi-party dialogue handler 210 for use in tagging the communications for delivery to the appropriate one of the single party or the multi-party dialogue handers processor 204, 210. The appropriately tagged communication is then transmitted via the bus 232 to the single party dialogue handler 204 or the multi-party dialogue handler 204, 210 based on the attached tag.

In some examples, the example conversation tagger/router 222 obtains information used to associate a conversation with a user device identifier from the example dialogue mode selector 216. The dialogue mode selector 216 learns the user device identifying information from the example distance tracker 202 which obtains the information when the source of the communication (e.g., the respective one of the user devices) comes within the conversation distance 130 of the robot 105. For example, upon determining that a user device has come within the conversation distance 130 of the robot 105, the distance tracker 202 can cause an appropriate one of the wireless transceivers 234, 236 to transmit a request for identification to the user device. Alternatively, the user devices (e.g., the user device A 115, the user device B 120, the user device C 125, etc.) can be structured to periodically transmit identifying information and location information to the distance tracker 202 for use in determining whether (and which) of the user devices (e.g., the user device A 115, the user device B 120, the user device C 125, etc.) has come within the conversation distance 130 of the robot 105. Any number of other methods may instead or also be used to track the identities of the user devices (e.g., the user device A 115, the user device B 125, the user device C 130) and the communications transmitted thereby.

To enable visual tracking of entities coming within the conversation distance 130, the example robot 130 is equipped with a camera 238 which supplies video to the video processing tools 224 of the dialogue manager 110. In some examples, the video processing tools 224 are capable of performing any number of video processing techniques including image recognition, image processing, motion detection, etc. The output of the video processing tools 224 are supplied to the single party and the multi-party dialogue handlers 204, 210 for usage in processing on-going conversations. For example, the robot 105 can rely on gestures (e.g., pointing) performed by a user with whom the robot 105 is conversing as needed to advance the conversation. Similarly, the robot 105 can rely on the video information to determine exactly where a user is standing when speaking to the robot 105 so that the robot 105 can position itself in an appropriately complementary manner when speaking to that user (e.g., the robot 105 can turn or otherwise move to face the user, etc.).

To permit the example robot 105 to respond to a user who expresses a desire to communicate directly with the robot 105 instead of via the user device (or for any number of other reasons), the robot 105 is equipped with an example microphone 240 or array of microphones. The microphone 240 captures the audio signals and forwards them to the example audio processing tools 226 of the dialogue manager 110. In some examples, the audio processing tools 226 are capable of performing any number of audio processing techniques including speech recognition, natural language processing, filtering, smoothing, etc. The output of the audio processing tools 226 are supplied to the single party and multi-party dialogue handlers 204, 210 for usage in processing on-going conversations/dialogues. In some examples, the single party and multi-party dialogue handlers 204, 210 can control an example speaker 241 of the robot 105. The speaker 241 can be used to play recorded audio, synthesized speech, etc. In some examples, the single party and multi-party dialogue handlers 204, 210 provide output to be provided to the speaker 241 via the audio processing tools 226.

In some examples, the example robot 105 additionally includes an example ambient sound recording device 242 and an example ambient light capturing device 244. The output of the ambient sound recording device 242 is supplied to the example ambient sound processing tool 228 disposed in the example dialogue manager 110 for processing. The ambient sound processing tool 228 performs any of a variety of sound processing tasks on the ambient sound signal recorded by the ambient sound recording device 242. A processed ambient sound signal is subsequently supplied to the example distance tracker 202 for use in determining the conversation distance 130 as described further hereinafter. The output of the ambient light capturing device 244 is supplied to the example ambient light processing tool 230 disposed in the dialogue manager 110 for processing. The ambient light processing tool 230 performs any of a variety of video signal/light signal processing tasks on the ambient light signal captured by the ambient light capturing device 244. A processed ambient light signal is subsequently supplied to the example distance tracker 202 for use in determining the conversation distance 130 as described further hereinafter.

In some examples, the robot 105 includes an example servo-motor 246 to control an appendage of the robot 105 (e.g., an "arm" that can be used to point/gesture), a motor used to propel the robot in a forward, backward, or side direction, etc. In some such examples, the example servo-motor controller 248 controls the servo-motor 246 (or other motor) in cooperation with the multi-party dialogue handler 210 when executing the multi-party dialogue processing algorithm 214.

In some examples, the example single party handler 204 and the multi-party dialogue handler 210 are implemented using different software modules, different software threads, different virtual machines, different hardware processors, a combination of hardware and software, etc. In some examples, the single party handler 204 and the multi-party dialogue handler 210 are implemented using a same software module, a same software thread, a same virtual machine, a same hardware processor, a same combination of hardware and software, etc. Likewise the first storage 206 and the second storage 212 can be implemented as a same storage.

Figure 3:
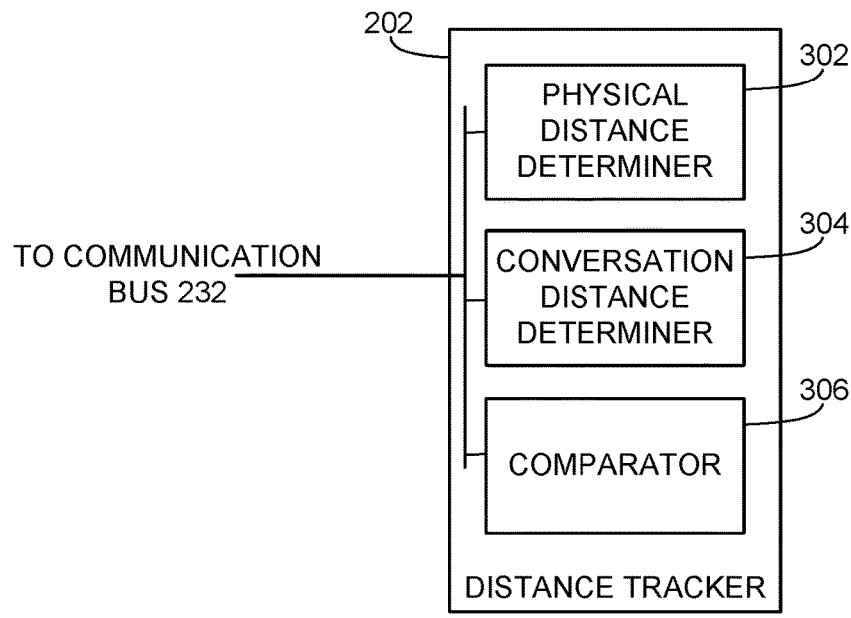
FIG. 3 is a block diagram of an example implementation of the example distance tracker of FIG. 2.

FIG. 3 is a block diagram of an example implementation of the example distance tracker 202 of FIG. 2. In the illustrated example of FIG. 3, the distance tracker 202 includes an example physical distance determiner 302, an example conversation distance determiner 304, and an example comparator 306. In some examples, the physical distance determiner 302 uses any of a variety of technologies to determine the location of any of the user devices (the user device A 115, the user device B, 120, the user device C 130, etc.) relative to the example robot 105 (e.g., to determine a distance between each user device and the robot 105). For example, any wireless technology can be used to determine the physical location of the user devices relative to the robot. Some such systems take advantage of existing wireless infrastructure for indoor positioning. For example, Bluetooth based technologies that communicate with indoor positioning systems can be deployed. In some such examples, the wireless transceivers 234, 236 emit and collect signals from the indoor positioning system and/or the user devices to determine the positions of the user devices relative to the robot 105. In some examples, the robot 105 uses the camera 238 to visually track the position of the user and/or the user device. In some examples, the distance tracker uses any combination of location detection/position tracking technologies to determine the distances between one or more of the user(s) and the robot 105.

The conversation distance determiner 304 determines the conversation distance 130. In some examples, the conversation distance determiner 304 is designed to use environmental information collected by the example ambient sound recording device 242 (see FIG. 2) and the ambient light capturing device 244 (see FIG. 2) to adjust an empirically determined conversation distance as described further below. The comparator 306 compares each physical distance determined by the physical distance determiner 302 to the conversation distance 130 determined by the conversation distance determiner 304. In some examples, when such a comparison indicates that a user device has come within the conversation distance 130 of the robot 105, the comparator 202 causes a user device identifier associated with the user device that came within the conversation distance 130 to be supplied to the example dialogue mode selector 216 (see FIG. 2) which uses the information (e.g., the fact that a user device has come within the conversation distance 130 of the robot 105, and the user device identifier of the user device) to control the single party dialogue handler 204 and/or the multi-party dialogue handler 210 as described hereinbefore. In some examples, the comparator 306 notifies the conversation tracker adjuster 220 which responds by incrementing the conversation tracker 218.

Figure 4:
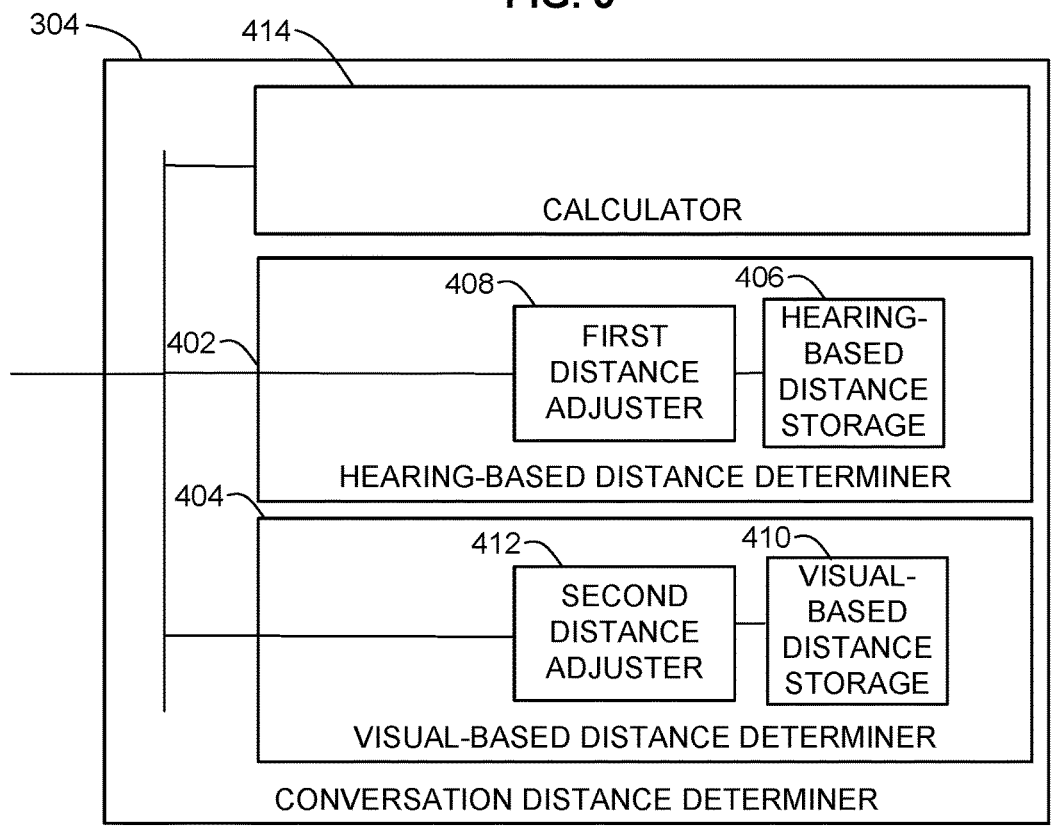
FIG. 4 is a block diagram of an example implementation of the example conversation distance determiner of FIG. 3.

FIG. 4 is a block diagram of an example implementation of the example conversation distance determiner 304 of FIG. 3. In the illustrated example of FIG. 4, the conversation distance determiner 302 includes an example hearing-based distance determiner 402 to determine the hearing-based distance and an example visual-based distance determiner 404 to determine the visual-based distance. As described hereinbefore, the hearing-based distance can be determined empirically. In some examples, the hearing-based distance can be determined using an empirically determined value that has been adjusted based on ambient sound conditions (e.g., environmental factors). In some such examples, the hearing-based distance determiner 402 includes an example hearing-based distance storage 406 in which an empirically determined hearing-based distance is stored. An example first distance adjuster 408 collects the stored hearing-based distance from the hearing-based distance storage 406 and adjusts the hearing-based distance using the sensed ambient sound signal supplied by the ambient sound processing tool 228 (FIG. 2) of the dialogue manager 110 (FIG. 2). The adjustment can take into consideration any number of factors including the background noise. Thus, in some examples, if the ambient background noise is significant at a first time, the radius of the circle representing the conversation distance 130 may be shorter than at a second time when the ambient background noise is insignificant or non-existent.

Referring still to FIG. 4, as described hereinbefore, the visual-based distance can also be determined empirically. In some examples, the sight-based distance can be determined using an empirically determined value that has been adjusted based on ambient light/visibility conditions (e.g., environmental factors). In some such examples, the visual-based distance determiner 404 includes an example visual-based distance storage 410 in which an empirically determined visual-based distance is stored. An example second distance adjuster 412 collects the stored visual-based distance from the visual-based distance storage 410 and adjusts the visual-based distance using the sensed ambient light signal supplied by the ambient light processing tool 230 (FIG. 2) of the dialogue manager 110. The adjustment can take into consideration any number of factors including changes in lighting as the day progresses, etc. Thus, in some examples, if the ambient light is dim at a first time, the radius of the circle representing the conversation distance 130 may be shorter than at a second time when the ambient light is bright.

In the illustrated example of FIG. 4, the adjusted hearing-based distance value and the adjusted visual-based distance value are supplied to an example calculator 414 which uses any of a variety of calculations to arrive at the conversation distance 130. In some examples, the calculator 414 selects the largest of the adjusted hearing-based distance value and the adjusted visual-based distance value as the conversation distance 130 to thereby ensure that the conversation based distance encompasses both the hearing-based distance and the visual-based distance.

In some examples, the example distance tracker 202 may determine that a user A is within the hearing-based distance but not the visual-based distance. In some such examples, the dialogue manager 202 can be structured to attempt to capture audio associated with the user A (e.g., to attempt to capture any audio from the user A and/or user A device 115 that may is discernible and store the audio for use in determining what topics are currently being discussed by user A with other nearby users for possible usage in any later conversations that might occur with the user A. Likewise, the example distance tracker 202 may determine that a user A is within the visual-based distance but not the hearing-based distance. In some such examples, the dialogue manager 202 can be structured to attempt to continue to visually track the user A and other users within the visual-based (but not hearing-based) distance for purposes of understanding the context of the ambient conditions. For example, the dialogue manager 110 can be structured to determine when a number of people within the conversation distance exceeds a threshold value, and in response, cause the speaker 204 to emit a statement such as "I detect that there are many people around; let's try to find a quieter place to have this conversation."

While example manners of implementing the robot 105 and the dialogue manager 110 are illustrated in FIG. 1, FIG. 2, FIG. 3, and/or FIG. 4, one or more of the elements, processes and/or devices illustrated in FIG. 1-FIG. 4 may be combined, divided, re-arranged, omitted, eliminated and/or implemented in any other way. Further, the example distance tracker 202, the example single party dialogue handler 204, the example first storage 206, the example first dialogue/conversation processing algorithm 208, the example multi-party dialogue handler 210, the example second storage 212, the example second dialogue/conversation processing algorithm 214, the example dialogue mode selector 216, the example conversation tracker 218, the example conversation tracker adjuster 220, the example conversation tagger/router 222, the example video processing tools 224, the example audio processing tools 226, the example ambient sound processing tools 228, the example ambient light processing tools 230, the example servo-motor controller(s) 248, the example communications bus 232, the example wireless signal transceivers 234, 236, the example camera 238, the example microphone 240, the example speaker 241, the example ambient sound recording device 242, the example ambient light capturing device 244, the example servo-motor 246, the example physical distance determiner 302, the example conversation distance determiner 304, the example comparator 306, the example hearing-based distance determiner 402, the example visual-based distance determiner 404, the example hearing-based distance storage 406, the example first distance adjuster 408, the example visual-based distance storage 410, the example second distance adjuster 412, the example calculator 414 and/or more generally the dialogue manager 110 of FIG. 1 and FIG. 2 and the robot 105 may be implemented by hardware, software, firmware and/or any combination of hardware, software and/or firmware. Thus, for example, any of the example distance tracker 202, the example single party dialogue handler 204, the example first storage 206, the example single party dialogue/conversation processing algorithm 208, the example multi-party dialogue handler 210, the example second storage 212, the example multi-party dialogue/conversation processing algorithm 214, the example dialogue mode selector 216, the example conversation tracker 218, the example conversation tracker adjuster 220, the example conversation tagger/router 222, the example video processing tools 224, the example audio processing tools 226, the example ambient sound processing tools 228, the example ambient light processing tools 230, the example servo-motor controller(s) 248, the example communications bus 232, the example wireless signal transceivers 234, 236, the example camera 238, the example microphone 240, the example speaker 241, the example ambient sound recording device 242, the example ambient light capturing device 244, the example servo-motor 246, the example physical distance determiner 302, the example conversation distance determiner 304, the example comparator 306, the example hearing-based distance determiner 402, the example visual-based distance determiner 404, the example hearing-based distance storage 406, the example first distance adjuster 408, the example visual-based distance storage 410, the example second distance adjuster 412, the example calculator 414, and/or more generally the dialogue manager 110 of FIG. 1 and FIG. 2 and the robot 105 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)).

When reading any of the apparatus or system claims of this patent to cover a purely software and/or firmware implementation, at least one of the example distance tracker 202, the example single party dialogue handler 204, the example first storage 206, the example single party dialogue/conversation processing algorithm 208, the example multi-party dialogue handler 210, the example second storage 212, the example multi-party dialogue/conversation processing algorithm 214, the example dialogue mode selector 216, the example conversation tracker 218, the example conversation tracker adjuster 220, the example conversation tagger/router 222, the example video processing tools 224, the example audio processing tools 226, the example ambient sound processing tools 228, the example ambient light processing tools 230, the example servo-motor controller(s) 248, the example communications bus 232, the example wireless signal transceivers 234, 236, the example camera 238, the example microphone 240, the example speaker 241, the example ambient sound recording device 242, the example ambient light capturing device 244, the example servo-motor 246, the example physical distance determiner 302, the example conversation distance determiner 304, the example comparator 306, the example hearing-based distance determiner 402, the example visual-based distance determiner 404, the example hearing-based distance storage 406, the example first distance adjuster 408, the example visual-based distance storage 410, the example second distance adjuster 412, the example calculator 414, the example dialogue manager 110 and the example robot 105 is/are hereby expressly defined to include a tangible computer readable storage device or storage disk such as a memory, a digital versatile disk (DVD), a compact disk (CD), a Blu-ray disk, etc. storing the software and/or firmware. Further still, the example robot 105 of FIG. 1 and FIG. 2 and the example dialogue manager 110 of FIG. 1 and FIG. 2 may include one or more elements, processes and/or devices in addition to, or instead of, those illustrated in FIG. 1 and FIG. 2 and/or may include more than one of any or all of the illustrated elements, processes and devices.

Flowcharts representative of example machine readable instructions for implementing the example dialogue manager 110 of FIG. 1 and FIG. 2 is shown in FIGS. 5-8. In these examples, the machine readable instructions comprise a program(s) for execution by a processor such as the processor 912 shown in the example processor platform 900 discussed below in connection with FIG. 9. The program(s) may be embodied in software stored on a tangible computer readable storage medium such as a CD-ROM, a floppy disk, a hard drive, a digital versatile disk (DVD), a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 5-8, many other methods of implementing the example dialogue manager 110 of FIG. 1 and FIG. 2 may alternatively be used. For example, the order of execution of the blocks may be changed, and/or some of the blocks described may be changed, eliminated, or combined.

As mentioned above, the example processes of FIGS. 5-8 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and transmission media. As used herein, "tangible computer readable storage medium" and "tangible machine readable storage medium" are used interchangeably.

Additionally or alternatively, the example processes of FIGS. 5-8 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and transmission media. As used herein, when the phrase "at least" is used as the transition term in a preamble of a claim, it is open-ended in the same manner as the term "comprising" is open ended.

Figure 5:
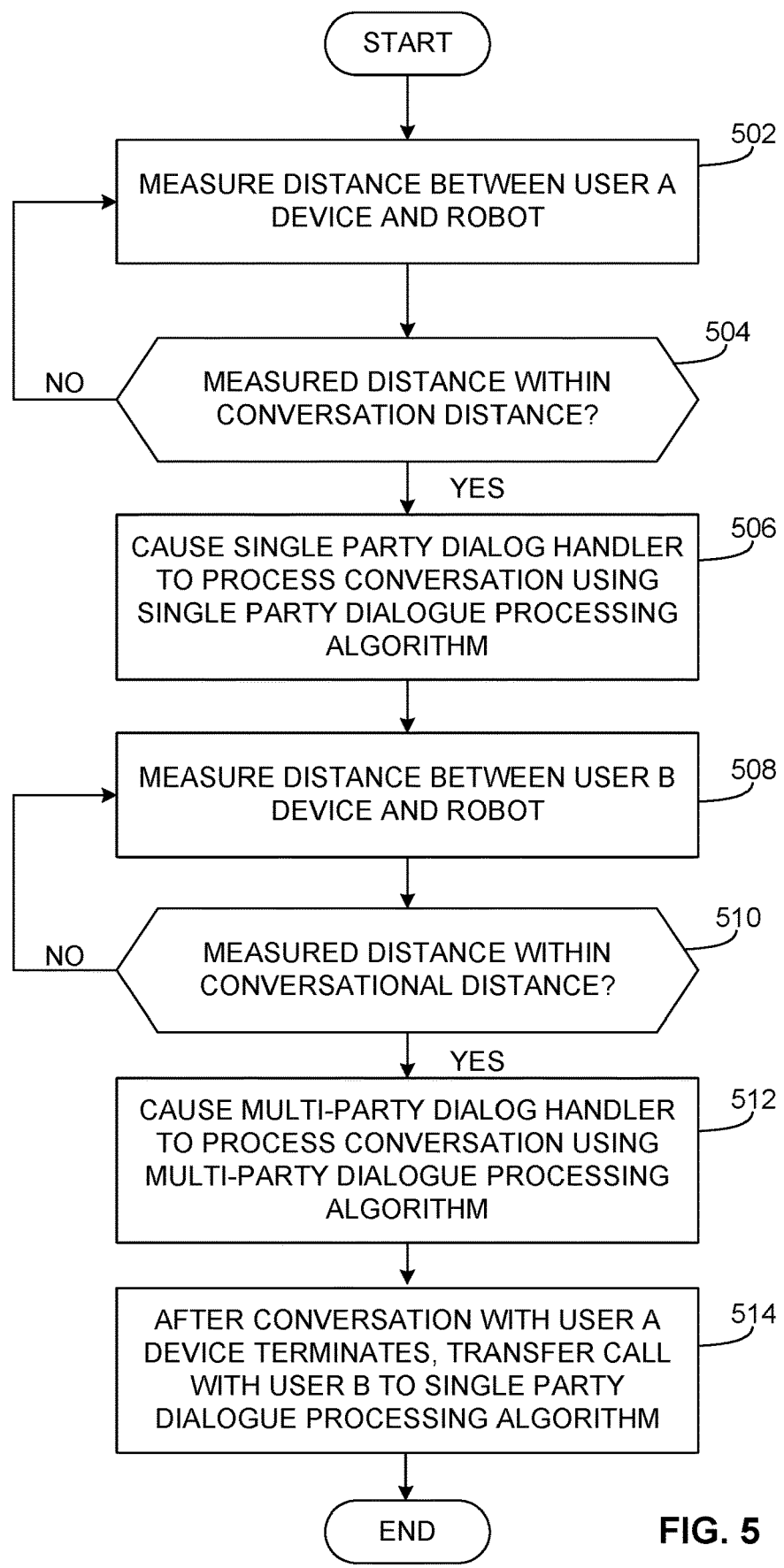
FIG. 5 is a flow chart representative of example machine readable instructions which may be executed to implement the example dialogue manager of FIG. 1 and FIG. 2.

The program 500 of FIG. 5 provides example operations performed by the example dialogue manager 110 of FIG. 1 and FIG. 2 and begins at block 502 at which the example distance tracker 202 determines a distance between a user device (e.g., the user A device 115) and the example robot 105. As described above, the techniques and technologies used by the distance tracker 202 to determine the distance between the user A device 115 and the example robot 105 can be any location detection technique supported by any location detection technology. The distance tracker 202 also determines, based on the distance between the user A device 115 and the robot 105, whether the user A device 115 has come within the conversation distance 130 of the robot 105 (block 504). If not, the distance tracker 202 again determines the distance between the user A device 115 and the robot 105 (the program returns to the block 502). In some examples, the distance tracker 202 continues to periodically determine the distance between the user A device 115 and the robot 105 to take into consideration any movements of the user A device 115 and/or the robot 105. If the user A device 115 has come within the conversation distance of the robot 105 (and assuming no other user devices are within the conversation distance 130 of the robot 105) as determined at block 504, a single party dialogue processing algorithm is used to process a conversation between the user A device 115 and the robot 105 (block 506). As described hereinbefore, in some examples, the single party dialogue processing algorithm 208 (also referred to as the first conversation processing algorithm 208) stored in the first storage 206 is executed by the single party dialogue handler 204. In some examples, the distance tracker 202 notifies the example dialogue mode selector 216 that the user A device 115 has come within the conversation distance of the robot 105 and the dialogue mode selector 216 responds by causing the single party dialogue handler 204 to process the conversation between the user A device 115 and the robot 105 by executing the single party dialogue processing algorithm 208. In some examples, the conversation between the user A device 115 and the robot 105 is initiated before the user A device 115 comes within the conversation distance of the robot 105. In some such examples, the on-going conversation would be processed by the single party dialogue processing algorithm 208 such that the dialogue mode selector 216 need not take any action. In some examples, a conversation has not yet been initiated between the user A device 115 and the robot 105 when the user A device 115 comes within the conversation distance 130 of the robot 105. In some such examples, the single party dialogue processing algorithm 208 can be designed to cause the robot 105 to attempt to initiate a conversation with the user A via the user A device 115. Such an attempt to initiate a conversation may include a question such as "May I help you with anything today?" The user A can respond via the user A device 115 by terminating the conversation (e.g., responding in the negative) or can continue the conversation by responding with a question, statement, command, etc.

Referring still to FIG. 5, the example distance tracker 202 also determines a distance between another user device (e.g., the user B device 120) and the example robot 105 (block 508). The distance tracker 202 also determines, based on the distance between the user B device 120 and the robot 105, whether the user B device 120 has come within the conversation distance 130 of the robot 105 (block 510). If not, the distance tracker 202 again determines the distance between the user B device 120 and the robot 105 (the program returns to the block 508). In some examples, the distance tracker 202 continues to periodically determine the distance between the user B device 120 and the robot 105 to take into consideration any movements of the user B device 120 and/or the robot 105. If the user B device 120 has come within the conversation distance 130 of the robot 105 (and assuming the user A device 115 is still within the conversation distance 130 of the robot 105 and the conversation between the user A device 115 and the robot 105 is on-going), a multi-party conversation processing algorithm 214 is used to process a conversation between the user B device 120 and the robot 105 (block 512). As described hereinbefore, in some examples, the multi-party dialogue processing algorithm 214 (also referred to as the second conversation processing algorithm 214) stored in the first storage 212 is executed by the multi-party dialogue handler 210. In some examples, the distance tracker 202 notifies the example dialogue mode selector 216 that the user B device 120 has come within the conversation distance 130 of the robot 105 and the dialogue mode selector 216 responds by causing the multi-party dialogue handler 210 to process the conversation between the user B device 120 and the robot 105 by executing the multi-party dialogue processing algorithm 214. In some examples, the conversation between the user B device 120 and the robot 105 is initiated before the user B device 120 comes within the conversation distance 130 of the robot 105. In some such examples, the on-going conversation would be initially be processed by the single party dialogue processing algorithm 208 such that the dialogue mode selector 216 would transfer control of the processing of the conversation from the single party dialogue processing algorithm 208 to the multi-party dialogue processing algorithm 214 executed by the multi-party dialogue handler 210. In addition to transferring control of the conversation, the conversation history of the conversation is transferred to the multi-party dialogue algorithm. In some examples, a conversation has not yet been initiated between the user B device 120 and the robot 105 when the user B device 120 comes within the conversation distance 130 of the robot 105. In some such examples, the multi-party dialogue processing algorithm 214 can be designed to cause the robot 105 to attempt to initiate a conversation with the user B via the user B device 120. However, before doing so, the multi-party dialogue processing algorithm 214 would cause the robot 105 to briefly disengage from the conversation with the user A via the user A device 115 (e.g., by emitting from the speaker 241 a statement such as, "Excuse me for one moment," or by displaying a message on the user A device 115 that states, "Please excuse me while I attend to another user for a moment."). The multi-party dialogue processing algorithm 214 could then cause the robot 105 to turn to the user B and indicate that assistance will be forthcoming shortly (e.g., by stating, "If you need assistance I will be with you shortly," or "I will be with you shortly," if the user B has already indicated a need for assistance via the user B device 120). In some examples, the dialogue manager 110 is structured to analyze the importance/criticality of the current topic being discussed in the conversations to determine which conversation shall be given priority. In some examples, the conversations are given priority based, at least in part, on the order in which the corresponding users entered the conversation distance or the order in which the conversations were initiated the robot 105.

After the conversation with the user A device 115 has terminated, the example dialogue mode selector 216 can transfer processing of the conversation with the user B device 120 from the multi-party dialogue processing algorithm 214 to the single party dialogue processing algorithm 208 (provided that there are no other user devices engaging in on-going conversations with the robot 105 that are within the conversation distance 130 of the robot 105) (block 514). In some examples, the multi-party processing algorithm 214 can process the conversation with the user B device 120 to completion regardless of whether there are any on-going conversations with other user devices. Thereafter the program ends.

Figure 6:
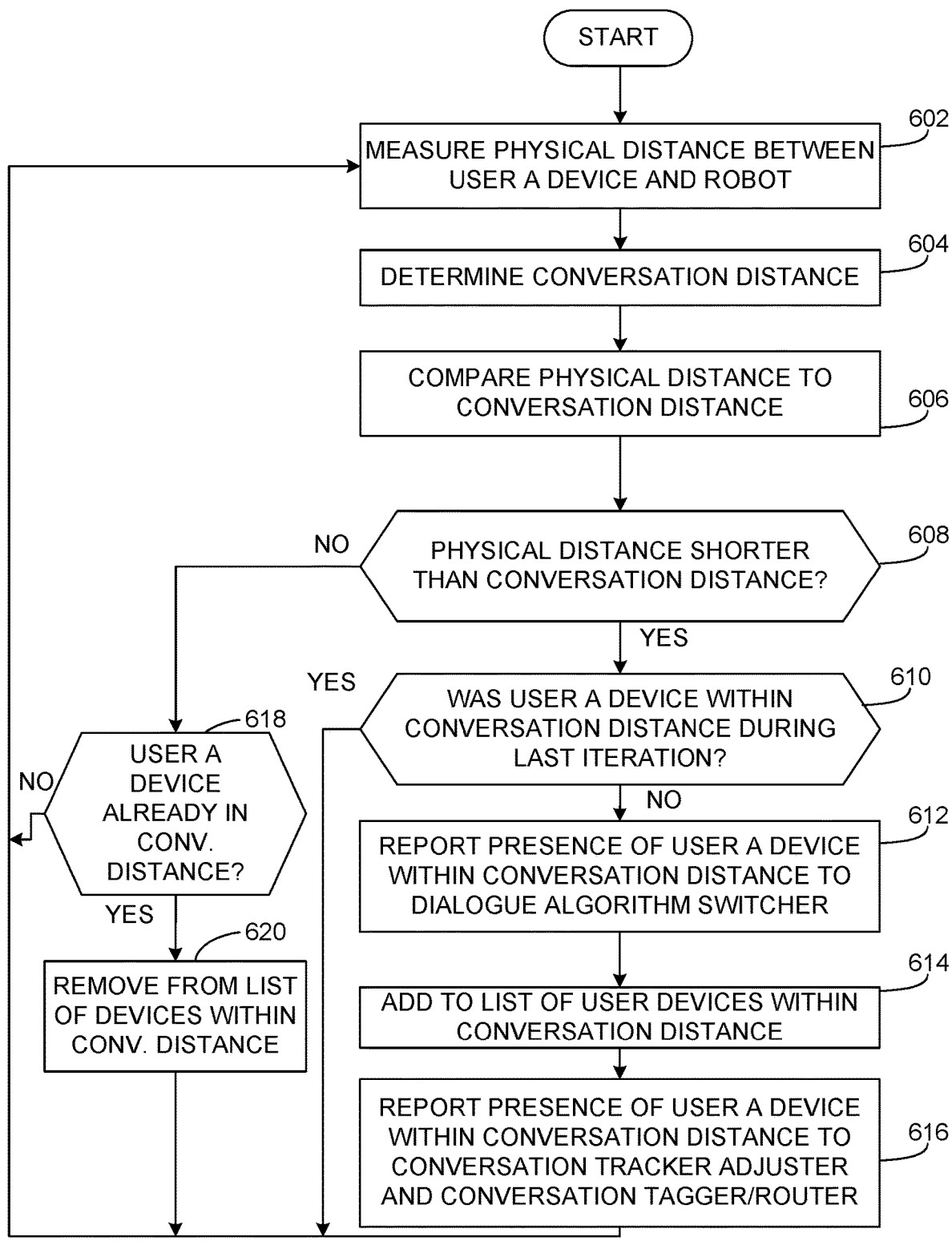
FIG. 6 is a flow chart representative of example machine readable instructions which may be executed to implement the example dialogue manager of FIG. 1 and FIG. 2.

The program 600 of FIG. 6 provides example operations performed by the example distance tracker 202 of FIG. 2 and FIG. 3 and begins at a block 602 at which the example physical distance determiner 302 of the distance tracker 202 determines a physical distance between a user device (e.g., the user A device 115) and the example robot 105. In addition, the example conversation distance determiner 304 determines the conversation distance 130 (block 604) in the manner described with reference to FIG. 3 and FIG. 4. The example comparator 306 of the distance tracker 202 compares the physical distance between the user A device 115 and the robot 105 to the conversation distance 130 (block 606) and determines whether the physical distance is shorter than the conversation distance 130 (block 608). If so, the user A device 115 is within the conversation distance 130 of the robot 105. The comparator 306 then determines whether the user A device 115 has already been determined to have come within the conversation distance 130 (e.g., during a previous iteration of the program 600) (block 610). If not, the user A device 115 is assumed to have just come within the conversation distance 130 of the robot 105 during the current iteration and the distance tracker 202 reports information identifying the user A device 115 (e.g., a user A device identifier) and the fact of the user A device 115 coming within the conversation distance 130 to the example dialogue mode selector 216 (block 612). In addition, the comparator 306 adds information identifying the user A device 115 (e.g., the user A device identifier) to a list of user device identifiers of user devices that have come within the conversation distance 130 of the robot 105 and that are currently within the conversation distance 130 of the robot 105 (block 614). The distance tracker 202 and/or the dialogue mode selector 216 also reports the information to the conversation tracker adjuster 220, and/or the conversation tagger/router 222 for use in tracking a conversation between user A device 115 and the robot 105 (block 616). After reporting the information, the program returns to the block 602.

If the comparator 306 determines that the physical distance between the user A device 115 and the robot 105 is shorter than the conversation distance 130 (block 608), the comparator determines whether the user device identifier of the user device is currently on the list of devices determined to have come within the conversation distance 130 (block 618). If so, the user device is now exiting the conversation distance 130 and the user device identifier is removed from the list (block 620) and the program returns to the block 602. If not, the user device was last tracked as being outside of the conversation distance 130 and the program returns to the block 602.

Figure 7:
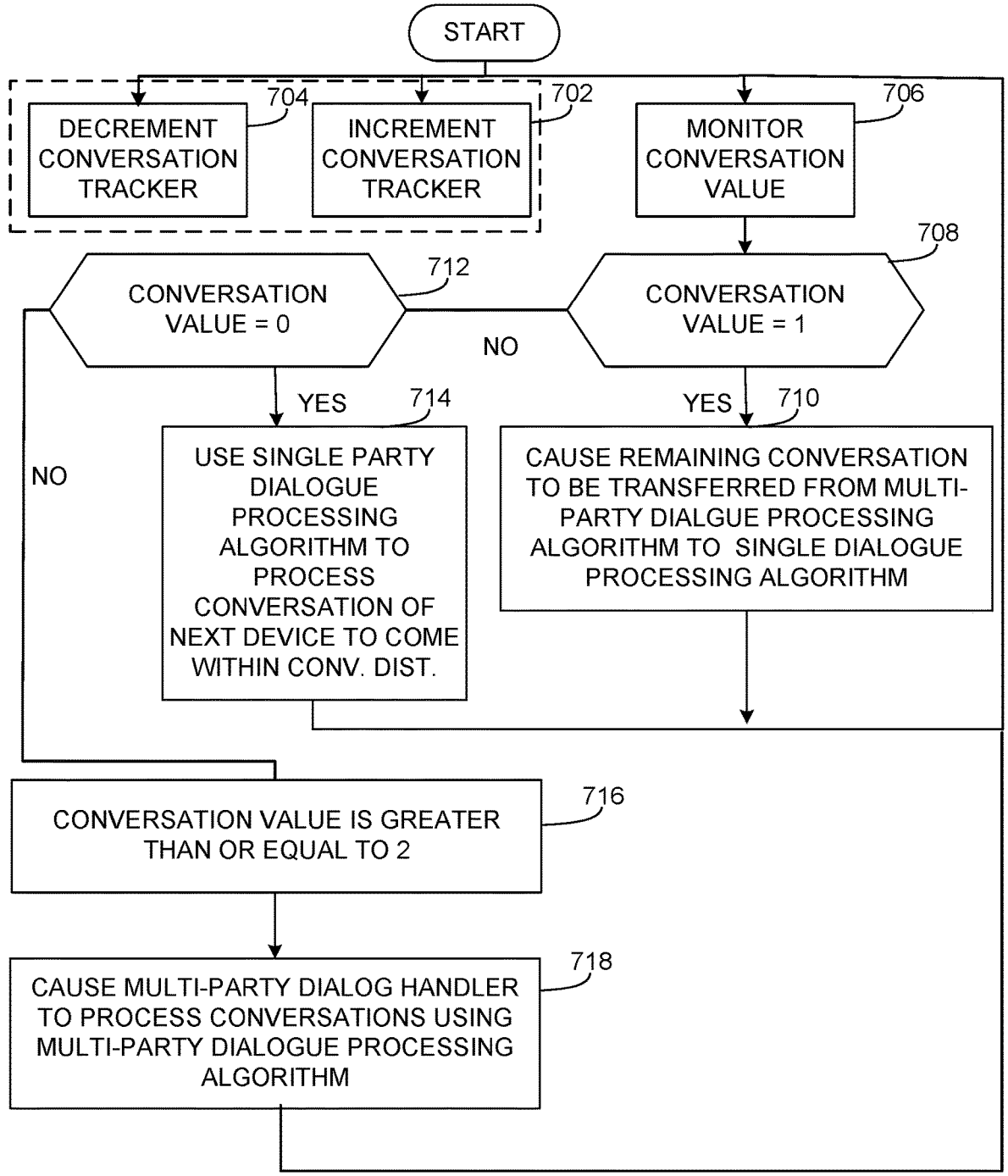
FIG. 7 is a flow chart representative of example machine readable instructions which may be executed to implement the example dialogue manager of FIG. 1 and FIG. 2.

The program 700 of FIG. 7 provides example operations performed by the example dialogue manager 110 of FIG. 1 and FIG. 2 and begins at a block 702 at which the distance tracker 202 notifies the conversation tracker adjuster 220 each time a user device comes within the conversation distance 130 of the robot 105 which, in turn, increments the conversation tracker 218 (block 702). When any of: 1) a conversation between one of the user devices within the conversation distance 130 is terminated, 2) a user operating a user device located within the conversation distance 130 indicates (via the user device) a desire to opt out of a multi-party dialogue with the robot 105, and/or 3) a user device is determined to have left the area bounded by a circle having a radius equal to the conversation distance, the dialogue mode selector 216 and/or the multi-party dialogue handler 210 executing the multi-party dialogue processing algorithm 214 notifies the conversation tracker adjuster 220 which responds by decrementing the conversation tracker 218 (block 704). In some examples, as the dialogue manager 110 controls the conversation tracker 218 in the manner described with reference to the blocks 702 and 704, the dialogue mode selector 216, operating in parallel, continuously monitors the value of the conversation tracker 218 (block 706). In some such examples, if the conversation tracker 218 holds a value of 1 (block 708), thereby indicating that only a single on-going conversation is occurring between the robot 105 and the user devices located within the conversation distance 130 of the robot 105, the dialogue mode selector 216 causes the processing of the last remaining conversation to be transferred from the multi-party dialogue processing algorithm 214 executed by the multi-party dialogue handler 210 to the single party dialogue processing algorithm 208 executed by the single party dialogue handler 204 (block 710). If the conversation tracker 218 holds a value of 0 (block 712), the dialogue mode selector 216 causes the conversation of the next user device that comes within the conversation distance 130 of the robot 105 to be processed by the single party dialogue processing algorithm 208 executed by the single party dialogue handler 204 (block 714)). If the conversation tracker 218 holds neither a value of 0 or 1, the conversation tracker 218 holds a value of 2 or greater (block 716) and the dialogue mode selector 216 causes conversations between the robot 105 and the user devices located within the conversation distance 130 of the robot 105 to be processed by the multi-party dialogue processing algorithm 214 executed by the multi-party dialogue handler 210 (block 718). Thereafter, the dialogue mode selector 216 continues checking the value of the conversation tracker 218 and basing operations thereon (as described with respect to blocks 708, 712, and 716).

Figure 8:
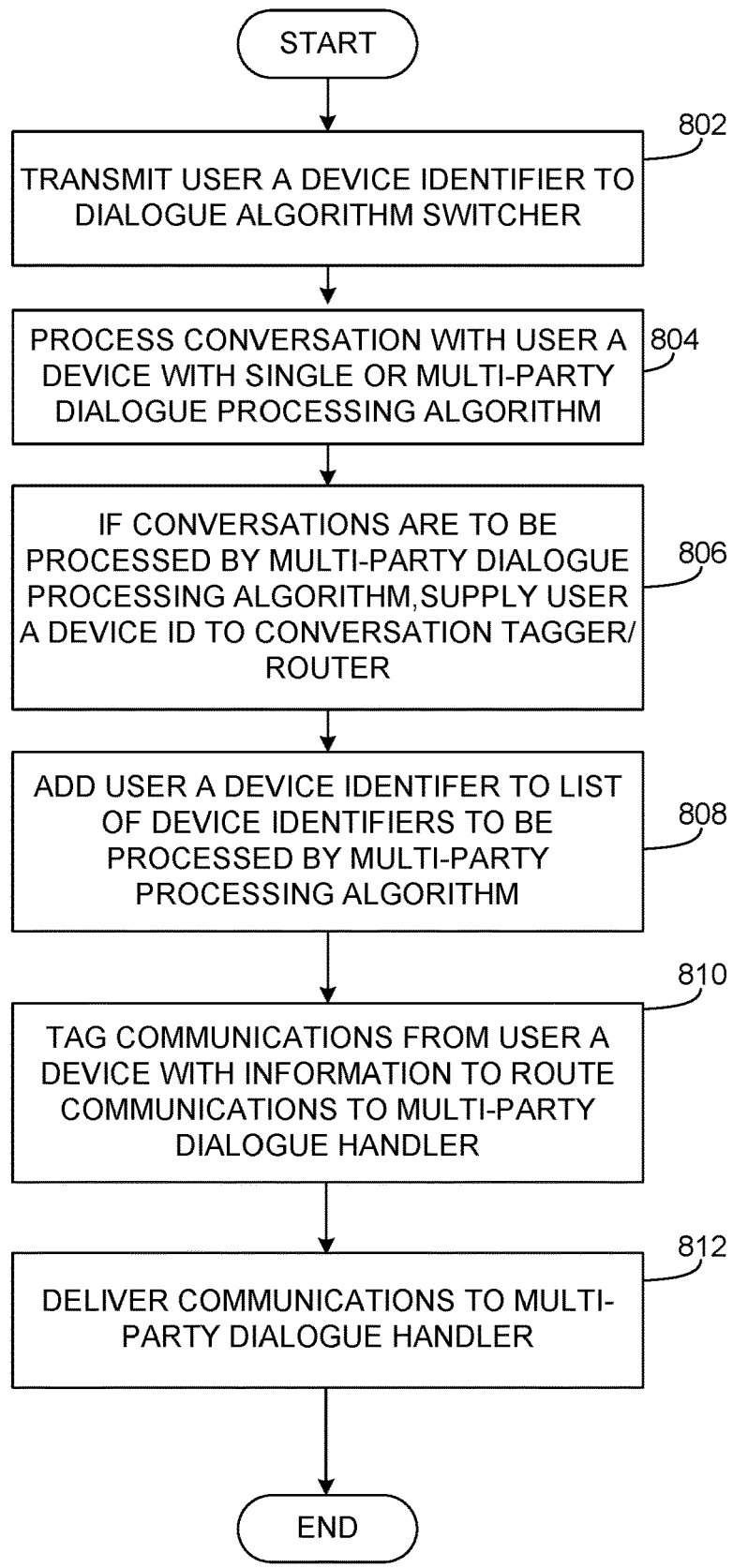
FIG. 8 is a flow chart representative of example machine readable instructions which may be executed to implement the example dialogue manager of FIG. 1 and FIG. 2.

The program 800 of FIG. 8 provides example operations performed by the example dialogue manager 110 of FIG. 1 and FIG. 2 and begins at a block 802 at which the example distance tracker 202, upon determining that a user device (e.g., the user A device 115) has come within the conversation distance of the robot 105, notifies the dialogue mode selector 216 and supplies a user device identifier corresponding to the user A device 115 to the dialogue mode selector 216. The distance tracker 202 can obtain the user device identifier when communicating with the user A device 115 during, for example, the distance determination process performed by the distance tracker 202. As described above with reference to FIG. 2, wireless communications transmitted by the user A device 115 are received at one of the wireless transceivers 234, 236 of the robot 105. The wireless communications sent by the user A device 115 include the user device identifier so that the dialogue manager can distinguish communications from the user A device 115 from communications transmitted by other user devices. The dialogue mode selector 216 uses the information received from the distance tracker 202 to cause conversations between the user A device 115 and the robot 105 to be processed by the single party dialogue processing algorithm 208 or the multi-party dialogue processing algorithm 214 (block 804). As described hereinbefore, in some examples, the dialogue mode selector 216 causes the conversations between a user device and the robot 105 to be processed by the multi-party dialogue processing algorithm 214, based on the value of the conversation tracker 218 at the time at which the user device comes within the conversation distance 130 of the robot 105. In some examples, the dialogue mode selector 216 causes the conversations between the robot 105 and all user devices that have come within the conversation distance 130 of the robot 105 to be processed by the multi-party dialogue processing algorithm 214.

If the conversations of the user A device 115 are to be processed by the multi-party dialogue processing algorithm 214, the dialogue mode selector 216 transmits the user device identifier of the user A device 115 to the conversation tagger/router 222 (block 806). The conversation tagger/router 222 adds the user A device identifier to a list of device identifiers (block 808). Thereafter, the conversation tagger/router 222 tags communications received from the user A device 115 at the wireless transceivers 234, 236 with routing information identifying that the communications are to be delivered to the multi-party dialogue handler 210 before supplying the information to the communication bus 232 (block 810). In some examples, the conversation tagger/router 222 monitors incoming communications for communications having the user A device identifier based on the inclusion of the user A device identifier on the list. In some such examples, when such communications are encountered, the conversation tagger/router 222 tags the communications to indicate that the communications are related to a conversation being processed by the multi-party dialogue processing algorithm 214 executed by the multi-party dialogue handler 210 (and not by the single party dialogue processing algorithm 208). The tagged communications are delivered to the multi-party dialogue handler 210 via the bus 232 (block 812) and the program ends.

Figure 9:
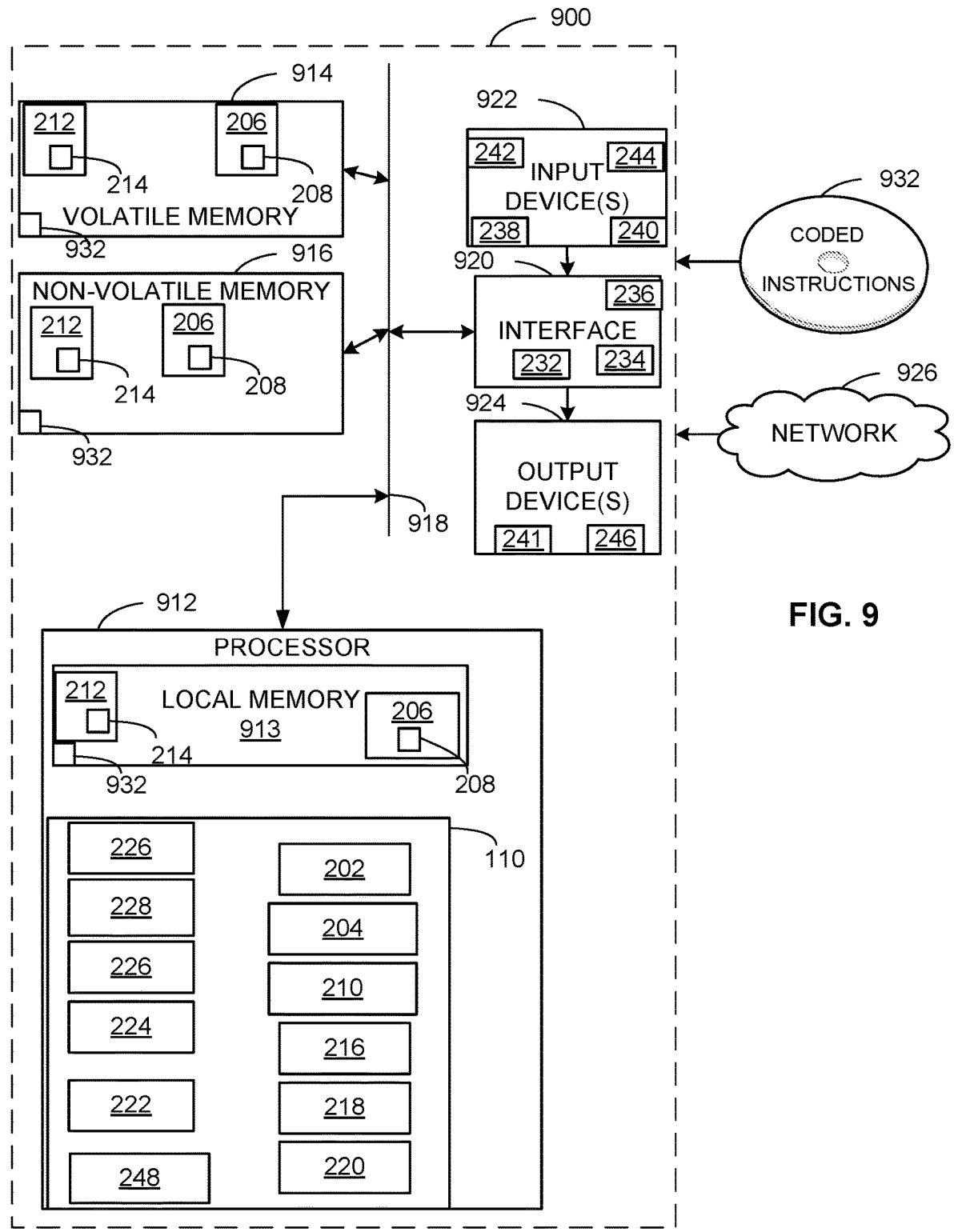
FIG. 9 is a block diagram of an example processor platform capable of executing the instructions of FIGS. 5, 6, 7 and/or 8 to implement the example dialogue manager of FIG. 2.

FIG. 9 is a block diagram of an example processor platform 900 capable of executing the instructions of FIGS. 5-8 to implement the dialogue manager 110 of FIG. 1 and FIG. 2. The processor platform 900 of the illustrated example includes a processor 912. The processor 912 of the illustrated example is hardware. For example, the processor 912 can be implemented by one or more integrated circuits, logic circuits, microprocessors or controllers from any desired family or manufacturer. In some examples, the processor 912 can be used to implement the example distance tracker 202, the example single party dialogue handler 204, the example multi-party dialogue handler 210, the example dialogue mode selector 216, the example conversation tracker 218, the example conversation tracker adjuster 220, the example communications tagger/router 222, the example audio processing tools 226, the example ambient sound processing tools 228, the example video processing tools 224, and the example ambient light processing tools 230.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 916 may be implemented by flash memory and/or any other desired type of memory device. Access to the main memory 914, 916 is controlled by a memory controller. In some examples, the volatile memory 914, and the non-volatile memory 916 can be used to implement the example first storage device 206, the example second storage device 212, the example hearing-based distance storage 406 and the example visual-based distance storage 410.

The processor platform 900 of the illustrated example can also include an interface circuit 920. The interface circuit 920 may be implemented by any type of interface standard, such as an Ethernet interface, a universal serial bus (USB), and/or a PCI express interface. In some examples, the interface circuit can be used to implement the example communication bus 232.

In the illustrated example, one or more input devices 922 are connected to the interface circuit 920. One or more output devices 924 can also be connected to the interface circuit 920 of the illustrated example. The output devices 924 can be implemented, for example, by display devices (e.g., a light emitting diode (LED), an organic light emitting diode (OLED), a liquid crystal display, emitting diode (LED). The interface circuit 920 of the illustrated example, thus, typically includes a graphics driver card, a graphics driver chip or a graphics driver processor.

The interface circuit 920 of the illustrated example also includes a communication device such as a transmitter, a receiver, a transceiver, a modem and/or network interface card to facilitate exchange of data with external machines (e.g., computing devices of any kind) via a network 926 (e.g., an Ethernet connection, a digital subscriber line (DSL), a telephone line, coaxial cable, a cellular telephone system, a low power wireless area network, etc.). In some examples, the example interface circuit 920 can be used to implement the example wireless transceivers 234, 236.

The processor platform 900 of the illustrated example also includes one or more mass storage devices 928 for storing software and/or data. Examples of such mass storage devices 928 include floppy disk drives, hard drive disks, compact disk drives, Blu-ray disk drives, RAID systems, and digital versatile disk (DVD) drives. In some examples, the mass storage device 928 can be used to implement the example first storage device 206, the example second storage device 212, the example hearing-based distance storage 406 and the example visual-based distance storage 410.

The coded instructions 932 of FIGS. 7-9 may be stored in the mass storage device 928, in the volatile memory 914, in the non-volatile memory 916, and/or on a removable tangible computer readable storage medium such as a CD or DVD.

A plurality of example methods, apparatus, and articles of manufacture are disclosed herein. Example no. 1 is a communication system including a distance tracker to determine whether any of a plurality of parties has come within a conversation distance of the communication system. The communication system also includes a first dialogue handler in communication with a first memory storing a single party dialogue processing algorithm and a second dialogue handler in communication with a second memory storing a multi-party dialogue processing algorithm. A dialogue mode selector of the communication system, in response to the distance tracker determining that a first party of the plurality of parties has come within a conversation distance of the communication system, causes the first dialogue handler to execute the single party dialogue processing algorithm to handle a first conversation with the first party. In addition, in response to the distance tracker determining that a second party of the plurality of parties has come within the conversation distance of the communication system, the dialogue mode selector causes the first dialogue handler to stop processing the first conversation and cause the second dialogue handler to execute the multi-party dialogue processing algorithm to handle the first conversation with the first party and to handle a second conversation with the second party.

Example no. 2 is the communication system of Example 1 further including a conversation tracker to track a number of on-going conversations being conducted by the communication system with different ones of the plurality of parties. The on-going conversations include the first conversation and the second conversation. The communication system of Example 2 also includes a conversation tracker adjuster to decrement the number of on-going conversations by one when an on-going conversation is terminated and to increment the number of on-going conversations by one when an attempt to initiate a new conversation is made.

Example No. 3 is the communication system of Example No. 1 wherein the distance tracker includes a physical distance determiner to determine respective physical distances between the respective parties and the communication system. The communication system of Example No. 3 further includes a conversation distance determiner to determine the conversation distance and a comparator to compare the respective physical distances to the conversation distance to determine whether any of the plurality of parties has come within the conversation distance.

Example No. 4 is the communication system of Example No. 3 wherein the conversation distance determiner includes a first distance determiner to determine a first distance. In Example No. 4, the first distance is a threshold hearing-based distance between a first person and a second person at which the first person, when speaking to the second person, expects to be heard by the second person. In Example No. 4, the communication system also includes a second distance determiner to determine a second distance. The second distance is a threshold sight-based distance between the first person and the second person at which the first person, when speaking to the second person, expects to be seen by the second person as speaking.

Example No. 5 is the communication system of Example No. 4, wherein the first distance determiner includes a storage including a reference value representing an empirically determined threshold hearing-based distance. In Example No. 5, the first distance determiner also includes an environmental audio sensor to sense audio in the environment of the communication system and a first distance adjuster to adjust the reference value based on the sensed audio. The adjusted reference value is as the first distance of Example No. 4.

Example No. 6 is the communication system of Example No. 4, wherein the second distance determiner includes a storage including a reference value representing an empirically determined threshold sight-based distance. In Example No. 6, the second distance determiner also includes an environmental visual sensor to sense a visibility condition in the environment of the communication system and a first distance adjuster to adjust the reference value based on the sensed visibility condition, the adjusted reference value to be used as the second distance.

Example No. 7 is the communication system of Example No. 2 and additionally includes a conversation initiator. In response to the distance tracker determining that the first party has come within the conversation distance of the communication system, the conversation initiator attempts to initiate the first conversation with the first party. In response to the distance tracker determining that the second party has come within the conversation distance of the communication system, the conversation initiator attempts to initiate the second conversation with the second party.

Example No. 8 is the communication system of claim 1 installed in a robot. In Example No. 8 the plurality of parties include a plurality of people.

Example No. 9 is the communication system of claim 1 wherein the respective plurality of parties communicate with the communication system via respective communication devices.

Example No. 10 is the communication system of claim 1, wherein the first dialogue handler and the second dialogue handler are a same dialogue handler and the first storage and the second storage are a same storage.

Example No. 11 is a method to process communications that includes determining, by executing an instruction with at least one processor, whether any of a plurality of parties has come within a conversation distance of a designated area, and, based on whether a first party of the plurality of parties has come within a conversation distance of the designated area, execute, with the at least one processor, a single party dialogue processing algorithm to process a first conversation with the first party. The method also includes, based on whether a second party of the plurality of parties has come within a conversation distance of the designated area, halting execution of the single party dialogue processing algorithm and executing, with the at least one processor, a multi-party dialogue processing algorithm, the multi-party dialogue processing algorithm to process the first conversation with the first party and the second conversation with the second party.

Example No. 12 is the method of Example No. 11 wherein the executing of the single party dialogue processing algorithm to process the first conversation with the first party is further based on whether an attempt to initiate the first conversation with the first party is successful. Further, in Example No. 12, the halting of the execution of the single party dialogue processing algorithm and the executing of the multi-party dialogue processing algorithm is further based on whether the first conversation is on-going when the second party is determined to have come within the conversation distance of the designated area.

Example No. 13 is the method of Example No. 11 that also includes, prior to the halting of the execution of the single party dialogue processing algorithm, determining whether the first conversation has terminated, and when the first conversation is determined to have terminated, causing the first processing algorithm to process the second conversation with the second party.

Example No. 14 is the method of Example No. 11 and also including tracking a number of on-going conversations being processed by the at least processor, decrementing the number of on-going conversations by one when an on-going conversation is terminated, and incrementing the number of on-going conversations by one when an attempt to initiate a new conversation is made.

Example No. 15 is the method of Example No. 11 wherein the determining of whether any of the parties have entered within the conversation distance of the designated area also further includes determining respective physical distances between the respective parties and the designated area. Example No. 15 also includes comparing the respective physical distances to the conversation distance to determine whether any of the plurality of parties has come within the conversation distance of the designated area.

Example No. 16 is the method of claim 15 and also includes determining the conversation distance by determining a first distance and a second distance. The first distance is a threshold hearing-based distance between a first person and a second person at which the first person, when speaking to the second person, expects to be heard by the second person. The second distance is a threshold sight based distance between the first person and the second person at which the first person, when speaking to the second person, expects to be seen by the second person as speaking.

Example No. 17 is a non-transitory machine readable storage medium having instructions which, when executed, cause a machine to at least determine whether any of a plurality of parties has come within a conversation distance of a designated area, and, based on whether a first party of the plurality of parties has come within a conversation distance of the designated area, execute a single party dialogue processing algorithm to process a first conversation with the first party. The instructions of Example No. 17 also cause the machine to based on whether a second party of the plurality of parties has come within a conversation distance of the designated area, halting execution of the single party dialogue processing algorithm and executing a multi-party dialogue processing algorithm, the multi-party dialogue processing algorithm to process the first conversation with the first party and the second conversation with the second party.

Example No. 18 is the storage medium of claim 17, wherein the executing of the single party dialogue processing algorithm to process the first conversation with the first party is further based on whether an attempt to initiate the first conversation with the first party is successful, and the halting of the execution of the single party dialogue processing algorithm and the executing of the multi-party dialogue processing algorithm is further based on whether the first conversation is on-going when the second party is determined to have come within the conversation distance of the designated area.

Example No. 19 is the storage medium of claim 17 wherein the instructions further cause the machine to, prior to the halting of the execution of the single party dialogue processing algorithm, determining whether the first conversation has terminated. In addition, the instructions cause a machine to, when the first conversation is determined to have terminated, causing the single party dialogue processing algorithm to process the second conversation with the second party.

Example No. 20 is the storage medium of claim 17 wherein the instructions further cause the machine to track a number of on-going conversations being processed, decrement the number of on-going conversations by one when an on-going conversation is terminated, and increment the number of on-going conversations by one when an attempt to initiate a new conversation is made.

Example No. 21 is the storage medium method of claim 17, wherein the instructions further to cause the machine to determine respective physical distances between the respective parties and the communication system, determine a conversation distance extending radially outward from the designated area, and compare the respective physical distances to the conversation distance to determine whether any of the plurality of parties has come within the conversation distance of the designated area.

Example No. 22 is an example communication system including means for determining whether any of a plurality of parties associated with portable electronic devices has come within a conversation distance of the communication system, first means for executing a single party dialogue processing algorithm, and second means for executing a multi-party dialogue processing algorithm. The communication system of Example No. 22 also includes means for selecting a dialogue mode, the means for selecting a dialogue mode to select one of the first means for executing or the second means for executing in response to an output supplied by the means for determining whether any of a plurality of parties associated with portable electronic devices has come within a conversation distance of the communication system.

Example No. 23 includes the communication system of Example No. 22 and also includes means to track a number of on-going conversations being conducted by the communication system with different ones of the plurality of parties, and a means to decrement the number of on-going conversations by one when an on-going conversation is terminated and to increment the number of on-going conversations by one when an attempt to initiate a new conversation is made.

Example No. 24 is the communication system of Example No. 1 and any combination of the elements/components of Example Nos. 2-10.

Example No. 25 is the method of claim 11 and any combination of the methods of Example Nos. 12-16.

Example No. 26 is the storage medium of Example No. 17 storing any combination of the instructions of Example Nos. 18-21.

From the foregoing, it will appreciated that methods, apparatus, and articles of manufacture that have been disclosed herein permit a robot to engage in conversation with users in either a one-on-one conversational manner or a multi-party conversational manner. Further, example methods, apparatus and articles of manufacture disclosed herein can change the type of processing to be used to process a conversation based on a distance between a user device and the robot. Example methods, systems, apparatus and articles of manufacture disclosed herein provide a variety of advantages. For example, some such methods, apparatus and articles of manufacture enhance the ability of the robot to engage with users in a more socially acceptable manner by permitting the robot to acknowledge the presence of more than a single user at a time.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A communication system comprising:
    first memory to store a single party dialogue processing algorithm;
    second memory to store a multi-party dialogue processing algorithm; and
    processor circuitry to execute computer readable instructions to at least:
        determine a first distance representative of a threshold hearing-based distance at which a first person, when speaking to a second person, would expect to be heard by the second person;
        determine a second distance representative of a threshold sight-based distance at which the first person, when speaking to the second person, would expect to be seen as speaking by the second person;
        determine whether any of a plurality of parties associated with portable electronic devices has come within a conversation distance of the communication system, the conversation distance based on the first distance and the second distance;
        in response to a determination that a first party of the plurality of parties has come within the conversation distance of the communication system, execute the single party dialogue processing algorithm to handle a first conversation with the first party; and
        in response to a determination that a second party of the plurality of parties has come within the conversation distance of the communication system, stop the single party dialogue processing algorithm from handling the first conversation and execute the multi-party dialogue processing algorithm to handle the first conversation with the first party and to handle a second conversation with the second party.

2. The communication system of claim 1, wherein the processor circuitry is to:
    track a number of on-going conversations being conducted by the communication system with different ones of the plurality of parties, the on-going conversations including the first conversation and the second conversation;
    decrement the number of on-going conversations by one when an on-going conversation is terminated; and
    increment the number of on-going conversations by one when an attempt to initiate a new conversation is made.

3. The communication system of claim 1, wherein the processor circuitry is to:
    determine respective physical distances between respective ones of the parties and the communication system;
    determine the conversation distance; and
    compare the respective physical distances to the conversation distance to determine whether any of the plurality of parties has come within the conversation distance.

4. The communication system of claim 3, wherein the processor circuitry is to:
    track a number of on-going conversations being conducted by the communication system with different ones of the plurality of parties, the on-going conversations including the first conversation and the second conversation;
    decrement the number of on-going conversations by one when an on-going conversation is terminated; and
    increment the number of on-going conversations by one when an attempt to initiate a new conversation is made.

5. The communication system of claim 1, wherein the processor circuitry is to:
    sense audio in an environment of the communication system;
    access a reference value representing an empirically determined threshold hearing-based distance; and
    adjust the reference value based on the sensed audio to determine an adjusted reference value, the adjusted reference value to be used as the first distance.

6. The communication system of claim 1, wherein the processor circuitry is to:
    sense a visibility condition in an environment of the communication system;
    access a reference value representing an empirically determined threshold sight-based distance; and
    adjust the reference value based on the sensed visibility condition to determine an adjusted reference value, the adjusted reference value to be used as the second distance.

7. The communication system of claim 1, wherein the communication system is installed in a robot and the plurality of parties include a plurality of people.

8. The communication system of claim 1, wherein respective ones of the plurality of parties are to communicate with the communication system via respective ones of the portable electronic devices.

9. The communication system of claim 1, wherein the first memory and the second memory are a same memory.

10. A method to process communications, the method comprising:
- determining, by executing an instruction with at least one processor, a conversation distance of a designated area based on (i) a first distance representative of a threshold hearing-based distance at which a first person, when speaking to a second person, would expect to be heard by the second person, and (ii) a second distance representative of a threshold sight-based distance at which the first person, when speaking to the second person, would expect to be seen as speaking by the second person;
- determining, by executing an instruction with the at least one processor, whether any of a plurality of parties has come within the conversation distance of the designated area;
- based on a first party of the plurality of parties coming within the conversation distance of the designated area, executing, with the at least one processor, a single party dialogue processing algorithm to process a first conversation with the first party; and
- based on a second party of the plurality of parties coming within the conversation distance of the designated area, halting execution of the single party dialogue processing algorithm and executing, with the at least one processor, a multi-party dialogue processing algorithm, the multi-party dialogue processing algorithm to process the first conversation with the first party and a second conversation with the second party.

11. The method of claim 10, wherein the executing of the single party dialogue processing algorithm to process the first conversation with the first party is further based on whether an attempt to initiate the first conversation with the first party is successful, and the halting of the execution of the single party dialogue processing algorithm and the executing of the multi-party dialogue processing algorithm is further based on whether the first conversation is on-going when the second party is determined to have come within the conversation distance of the designated area.

12. The method of claim 10, further including:
- prior to the halting of the execution of the single party dialogue processing algorithm, determining whether the first conversation has terminated; and
- when the first conversation is determined to have terminated, causing the single party dialogue processing algorithm to process the second conversation with the second party.

13. The method of claim 10, further including:
- tracking a number of on-going conversations being processed by the at least one processor;
- decrementing the number of on-going conversations by one when an on-going conversation is terminated; and
- incrementing the number of on-going conversations by one when an attempt to initiate a new conversation is made.

14. The method of claim 10, wherein the determining of whether any of the parties has entered within the conversation distance of the designated area includes:
- determining respective physical distances between respective ones of the parties and the designated area; and
- comparing the respective physical distances to the conversation distance to determine whether any of the plurality of parties has come within the conversation distance of the designated area.

15. The method of any of claim 10, wherein the determining of whether any of the parties has entered within the conversation distance of the designated area includes:
- determining respective physical distances between respective ones of the parties and the designated area; and
- comparing the respective physical distances to the conversation distance to determine whether any of the plurality of parties has come within the conversation distance of the designated area.

16. At least one non-transitory computer readable medium comprising instructions which, when executed, cause a machine to at least:
- determine a conversation distance of a designated area based on (i) a first distance representative of a threshold hearing-based distance at which a first person, when speaking to a second person, would expect to be heard by the second person, and (ii) a second distance representative of a threshold sight-based distance at which the first person, when speaking to the second person, would expect to be seen as speaking by the second person;
- determine whether any of a plurality of parties has come within a conversation distance of a designated area;
- based on a first party of the plurality of parties coming within the conversation distance of the designated area, execute a single party dialogue processing algorithm to process a first conversation with the first party; and
- based on a second party of the plurality of parties coming within the conversation distance of the designated area, halt execution of the single party dialogue processing algorithm and execute a multi-party dialogue processing algorithm, the multi-party dialogue processing algorithm to process the first conversation with the first party and a second conversation with the second party.

17. The at least one non-transitory computer readable medium of claim 16, wherein the instructions cause the machine to execute the single party dialogue processing algorithm based on whether an attempt to initiate the first conversation with the first party is successful, and halt the execution of the single party dialogue processing algorithm and execute the multi-party dialogue processing algorithm based on whether the first conversation is on-going when the second party is determined to have come within the conversation distance of the designated area.

18. The at least one non-transitory computer readable medium of claim 16, wherein the instructions cause the machine to:
- prior to the halting of the execution of the single party dialogue processing algorithm, determine whether the first conversation has terminated; and
- when the first conversation is determined to have terminated, cause the single party dialogue processing algorithm to process the second conversation with the second party.

19. The at least one non-transitory computer readable medium of claim 16, wherein the instructions cause the machine to:
- track a number of on-going conversations being processed;
- decrement the number of on-going conversations by one when an on-going conversation is terminated; and
- increment the number of on-going conversations by one when an attempt to initiate a new conversation is made.

20. The at least one non-transitory computer readable medium of claim 16, wherein the instructions cause the machine to:

determine respective physical distances between respective ones of the parties and the designated area;

determine the conversation distance to extend radially outward from the designated area; and compare the respective physical distances to the conversation distance to determine whether any of the plurality of parties has come within the conversation distance of the designated area.

21. A communication system comprising:

means for determining whether any of a plurality of parties associated with portable electronic devices has come within a conversation distance of the communication system, the means for determining to determine the conversation distance based on (i) a first distance representative of a threshold hearing-based distance at which a first person, when speaking to a second person, would expect to be heard by the second person, and (ii) a second distance representative of a threshold sight-based distance at which the first person, when speaking to the second person, would expect to be seen as speaking by the second person;

first means for executing a single party dialogue processing algorithm;

second means for executing a multi-party dialogue processing algorithm; and means for selecting a dialogue mode, the means for selecting the dialogue mode to select one of the first means for executing or the second means for executing in response to an output supplied by the means for determining whether any of a plurality of parties associated with portable electronic devices has come within the conversation distance of the communication system.

22. The communication system of claim 21, further including:

means for tracking a number of on-going conversations being conducted by the communication system with different ones of the plurality of parties; and means for adjusting the number of on-going conversations, the means for adjusting to decrement the number of on-going conversations by one when an on-going conversation is terminated and to increment the number of on-going conversations by one when an attempt to initiate a new conversation is made.

\* \* \* \* \*